UNITED STATES PATENT OFFICE.

JOHN FARREL, OF PHILADELPHIA, PENNSYLVANIA.

IMPROVEMENT IN LINING FOR FIRE-PROOF SAFES.

Specification forming part of Letters Patent No. 9,861, dated July 19, 1853.

*To all whom it may concern:*

Be it known that I, JOHN FARREL, of Philadelphia, in the county of Philadelphia and State of Pennsylvania, have invented a new and Improved Composition of Matter, which is designed to be used in the construction of metallic safes for the purpose of resisting the transmission of heat, and therefore in preserving the contents of such safes from the effects of fire, of which the following is a specification.

The matter of my invention consists in the introduction of flour, grain, or other vegetable substances into the space which in such safes is usually filled with non-conducting materials. I have found it useful to combine with them lime, cement, or other similar and well-known materials usually employed to give a set and hardened character.

To enable others who are skilled in the art to make and use my invention, I will proceed to describe its construction and its manner of operation.

I construct a double chest in the usual and ordinary way in which fire-proof safes are commonly constructed. The outer incloses the inner chest, leaving between them a space of from three to six inches in width. I fill this space or vacancy as compactly as possible with the lining materials above mentioned, and I prepare it for the purpose as follows, viz: I take common flour or vegetable matter of a similar nature—such as wheat, rye, maize, barley, starch, &c.—and having carefully rubbed and pulverized the same I mix it with water until it assumes the consistency of thick dough. I then introduce it into the space or vacancy in the chest, as just mentioned. As it is useful that this composition should become hard and solid after its introduction into the chest, I have found that it will become so by mixing it with lime, plaster, cement, or any other well-known materials, which will cause it to set and give it a hardened nature.

The usefulness of this composition consists in its superiority as a non-conductor of heat over any other substance now known or in use. I have found by actual experience that it possesses the property of resisting the transmission of heat in at least twice the degree in which those substances hitherto considered the most useful for that purpose possess the same property. As heat is applied this substance gives off and develops a latent moisture upon the inner case of the chest, and when at last this moisture is wholly driven off, instead of becoming heated and thus a ready conductor of heat, as is the case with all substances previously used, it carbonizes, and thus continues to be a non-conductor of heat.

What I claim as my invention, and desire to secure by Letters Patent, is—

The application and use of flour, grain, maize, starch, or other vegetable substance of a like nature, either alone or in combination with lime, cement, or similar substances, in the construction of fire-proof chests or safes, substantautially as above described.

JOHN FARREL.

Witnesses:
M. E. CUYLER,
WM. H. FISHER, Jr.